United States Patent
Twardosz

[11] Patent Number: 6,158,777
[45] Date of Patent: Dec. 12, 2000

[54] INFORMATION SHEET AND A METHOD FOR ITS FOLDING

[76] Inventor: Brian M Twardosz, 12941 Exchange, Chicago, Ill. 60633

[21] Appl. No.: 08/978,649

[22] Filed: Nov. 26, 1997

Related U.S. Application Data

[63] Continuation-in-part of application No. 08/345,584, Nov. 28, 1994, abandoned.

[51] Int. Cl.[7] .................................................. B42D 15/00
[52] U.S. Cl. ............................... 283/62; 283/67; 283/62; 283/34; 281/2; 281/5
[58] Field of Search .................................. 283/34, 35, 61, 283/62, 56, 51; 434/150; 281/2, 5, 38

[56] References Cited

U.S. PATENT DOCUMENTS

| | | | |
|---|---|---|---|
| 2,615,732 | 10/1952 | Falk | 283/34 |
| 4,856,818 | 8/1989 | Rabenecker et al. | |
| 4,917,405 | 4/1990 | Muth et al. | |
| 4,968,062 | 11/1990 | Bus | |
| 5,018,764 | 5/1991 | Beardell | |
| 5,156,898 | 10/1992 | McDonald | |

OTHER PUBLICATIONS

Single fold business card—undated.
Indianapolis map—Copyright 1991.
Folded Club Listing—dated Sep., 1991.

Primary Examiner—Willmon Fridie, Jr.
Attorney, Agent, or Firm—Hill and Simpson

[57] ABSTRACT

A system for folding a sheet of material is provided. Creases are formed in the sheet representing fold lines for the sheet. A plurality of first indicia markings are provided on the sheet with each first marking being positioned so as to align with a respective one of a plurality of second indicia markings when the sheet is correctly folded along the crease lines. In an embodiment, the sheet size is a multiple of 2 inches by 3.5 inches to allow the sheet to be folded into a business card size which will readily fit into a pocket, purse or a wallet. In an embodiment, the sheet is folded so as to have a final folded size of no greater than 20 square inches. To permit an easy and full viewing of any particular segment of information printed on the sheet, the sheet is folded by a plurality of lateral and longitudinal folds to provide a plurality of panels bounded by fold lines. Discrete segments of information are printed on the panels. The fold lines are arranged so that some of the discrete segments of information are fully visible upon the opening of a predetermined number of the folds, fewer than all of the folds. A package with no face greater than twenty square inches and a thickness of less than one half of an inch may be provided for receiving the folded sheet.

22 Claims, 8 Drawing Sheets

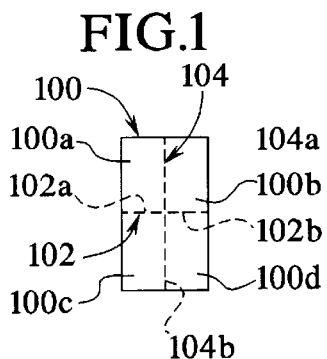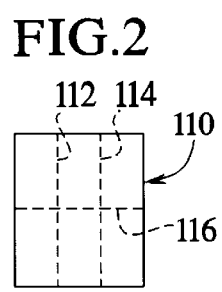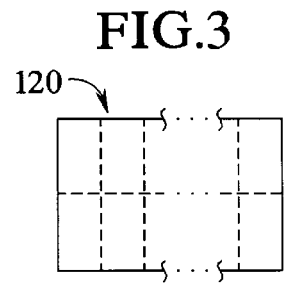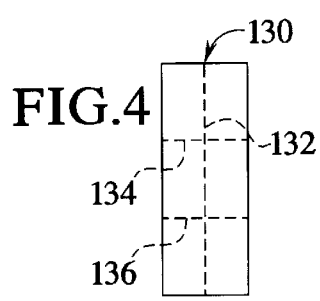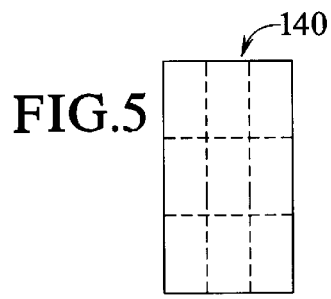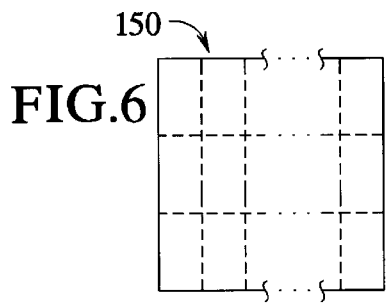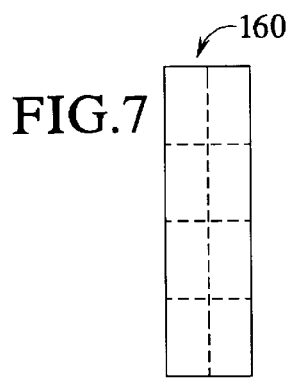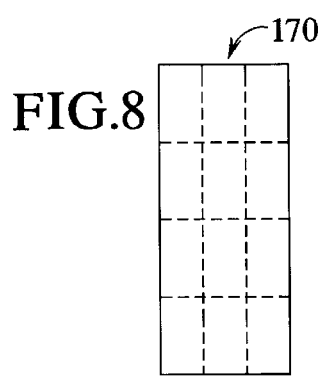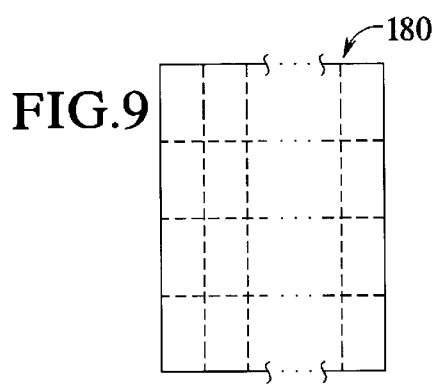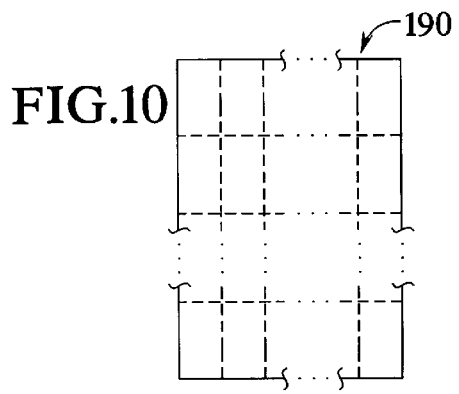

INFORMATION SHEET AND A METHOD FOR ITS FOLDING

This application is a continuation-in-part application under Rule 37 CFR §153(b) of U.S. patent application Ser. No. 08/345,584 filed Nov. 28, 1994, now abandoned.

BACKGROUND OF THE INVENTION

The present invention relates to a folded informational sheet and a method for folding such a sheet.

Many types of informational sheets are well known. Oftentimes such sheets contain various segments of information on the sheet placed in various locations on the sheet. Further, such sheets are sometimes folded, most commonly in the case of maps. In such cases, usually the folding patterns are complicated or, because of the need to fully open the sheet to gain access to the entire segment of information being reviewed, it becomes difficult, unwieldy or impossible to refold the sheet correctly. Oftentimes individual segments of information, such as smaller area maps, or street information, are not completely visible upon the opening of a discrete number of folds, but rather, more of the sheet must be unfolded than is necessary and then the user makes a new fold to reduce the size of the sheet being exposed, thus causing new fold lines which interfere with the correct refolding of the sheet. Also, new folds or reverse folding along an established fold crease could cause damage to the structural integrity of the sheet, particularly when the sheet is made of paper, where such improper folding causes tearing to occur.

In addition, many times the sheet, even when correctly fully folded, remains quite large so that it cannot conveniently be placed into a users pocket or purse, thus resulting in a less than completely useful sheet of information, or at best a bulky and unwieldy sheet.

SUMMARY OF THE INVENTION

The present invention provides a sheet of information and a method for its folding which overcomes the above mentioned shortcomings.

In one embodiment of the invention, a system for folding a sheet of material is provided wherein the sheet has a length and a width. Creases are formed in the sheet representing fold lines for the sheet. At least one of the creases extends across the full width of the sheet and at least one of the creases extends across a full length of the sheet. In this manner the sheet will be folded both widthwise and lengthwise. A plurality of first indicia markings are provided on the sheet which may be letters, numbers or other symbols. Each of the first indicia markings is positioned so as to individually align (such as by overlying) with a respective one of a plurality of second indicia markings when the sheet is correctly folded along a plurality of the crease lines. With this system, the user will always be provided with a visual guide as to the correct folding pattern for the sheet.

In most cases, the sheet will have at least one of the creases which comprises a plurality of crease segments with adjacent crease segments representing folds of opposite directions. That is, due to an earlier folding in one direction, such as lengthwise, a later folding in another direction, such as widthwise, will result in the crease extending across the width being formed of crease segments with adjacent segments representing opposite folds.

Preferably, the pairs of aligned first and second indicia markings are identical to make it easy for the user to properly align the markings and to execute the proper fold pattern. If numbers are used, they may each correspond to the fold number in a correct sequence of folding or unfolding the sheet.

Although the sheet may have an irregular or non-rectangular periphery, preferably it does have a rectangular periphery. Also, in the preferred embodiment, the sheet has a continuous outer periphery uninterrupted by slits, although in some versions, slits may be provided to result in a particular desired fold pattern.

In some fold patterns, all of the creases extend either across the full width or the full length of the sheet, however, particularly in the case of diagonal folds, the creases may extend only across a partial width of the sheet.

In a most preferred embodiment of the invention, the sheet size is a multiple of approximately 2 inches by 3.5 inches. This will allow the sheet to be folded into a business card or credit card size which will readily fit into a pocket, purse or even a wallet. In such an embodiment, the overall sheet would preferably be dimensioned in the range of 4 inches by 7 inches to 32 inches by 56 inches.

Other sizes may be provided within the scope of the present invention. For example, the invention includes an informational document printed on a single sheet of material having one side with a length at a multiple of 1–4 inches and an adjacent side with a length at a multiple of 2–5 inches and being folded at least once in each of two perpendicular directions to result in a folded sheet in the dimensions of 1–4 inches by 2–5 inches.

In any event, in a preferred embodiment of the invention, the sheet is folded so as to have a final folded size of no greater than 20 square inches, although some aspects of the invention, such as the folding system with the indicia markings may be used on a folded sheet of any final folded size.

To permit an easy and full viewing of any particular segment of information printed on the sheet, the present invention provides for a single sheet of material folded by a plurality of lateral and a plurality of longitudinal folds to provide a plurality of panels bounded by fold lines. Discrete segments of information are printed on a plurality of the panels, with some segments of information perhaps being contained completely on a single panel and other segments of information covering two or more panels.

It is preferred that each segment of information occupy a whole number of panels. The fold lines are arranged so that some of the discrete segments of information are fully visible upon the opening of a predetermined number of the fords, fewer than all of the folds. In this manner, most of the information contained on the sheet will be completely visible by a selective unfolding of the sheet, without the need to completely unfold the entire sheet, and without the need to refold the sheet in a different fold pattern to view the selected segment of information.

For example, a first discrete segment of information may be fully visible upon the opening of a first of the folds. Also, a second discrete segment of information may be fully visible upon the opening of a second of the folds. Further, a third discrete segment of information may be fully visible upon the opening of a third of the folds, etc.

In one embodiment of the invention, a single sheet may be provided wherein a segment of information consumes one entire side of said sheet and a plurality of segments of information are printed on an opposite side of said sheet.

The information presented on the sheet may be textual, graphical, pictorial, etc.

Further, the invention provides for an overall pocket size information sheet system. Such a system includes a single sheet of material folded by a series of folds to a size no greater than twenty square inches to provide a plurality of panels bounded by fold lines. A plurality of discrete segments of information are printed on a plurality of the panels, the fold lines being arranged so that a plurality of discrete segments of information are fully visible upon the opening of a predetermined number of said folds, fewer than all of the folds. Also, the system includes a package with no face greater than twenty square inches and a thickness of less than one half of an inch for receiving the folded sheet. In a preferred embodiment, the package has at least one transparent face.

BRIEF DESCRIPTION OF THE DRAWINGS

FIG. 1 illustrates a sheet of material to be folded and comprising a two-by-two panel array.

FIG. 2 illustrates a sheet of material to be folded and comprising a three-by-two panel array.

FIG. 3 illustrates a sheet of material to be folded and comprising an n-by-two panel array.

FIG. 4 illustrates a sheet of material to be folded and comprising a two-by-three panel array.

FIG. 5 illustrates a sheet of material to be folded and comprising a three-by-three panel array.

FIG. 6 illustrates a sheet of material to be folded and comprising an n-by-three panel array.

FIG. 7 illustrates a sheet of material to be folded and comprising a two-by-four panel array.

FIG. 8 illustrates a sheet of material to be folded and comprising a three-by-four panel array.

FIG. 9 illustrates a sheet of material to be folded and comprising an n-by four panel array.

FIG. 10 illustrates a sheet of material to be folded and comprising an n-by-n panel array.

Figures 20, 21, 22, 23:
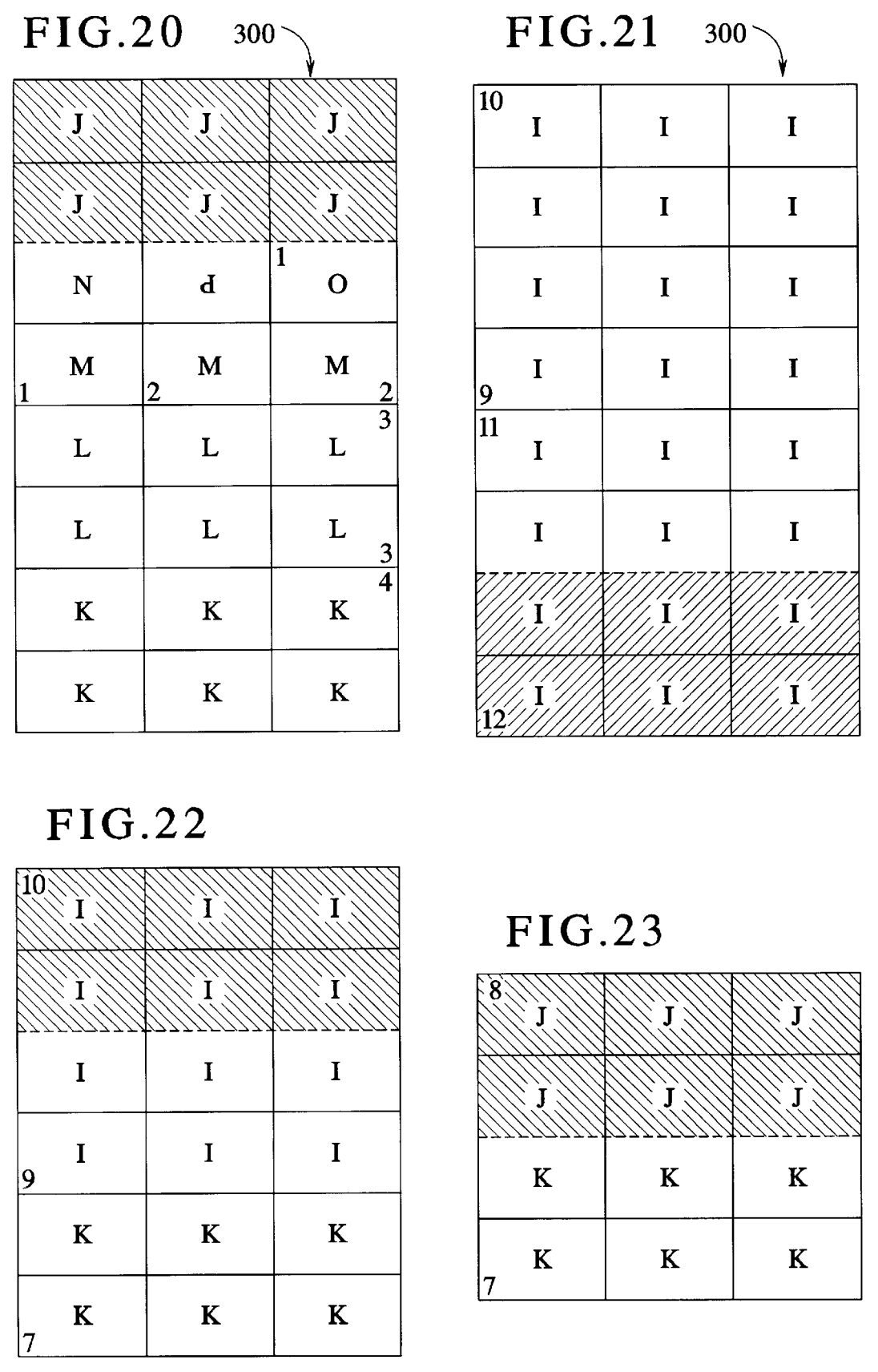

FIG. 20 illustrates a sheet of the same dimension as that shown in FIG. 11, however, the information is presented differently thereon and the folding scheme different as well.

FIG. 21 illustrates the reverse side of the sheet of FIG. 20 and illustrates a first fold line.

FIG. 22 illustrates the sheet of FIG. 21 after the first fold and illustrates a second fold line.

FIG. 23 illustrates the sheet of FIG. 22 after the second fold and illustrates a third fold line.

DETAILED DESCRIPTION OF THE PREFERRED EMBODIMENTS

Figure 11:
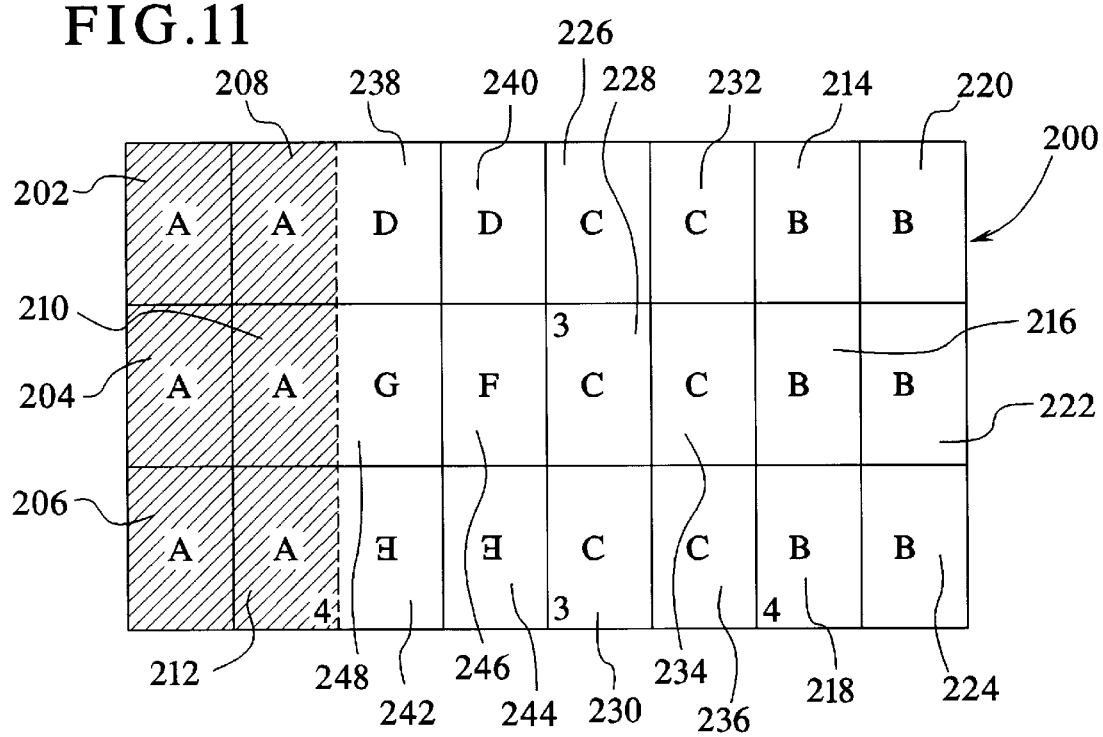
FIG. 11 illustrates a sheet of material marked in accordance with the principles of the present invention and representing a first side of the sheet.

The present invention provides a sheet of material which has information thereon, preferably in a printed form. In one aspect of the invention, the sheet is folded along preformed fold lines, which folding may be assisted by markings on the sheet and the sheet may be folded into a size convenient to carry in a pocket, purse or wallet or other carrying case. Although the sheet may be formed from a wide variety of materials and may contain a wide variety of information or segments of information thereon, various examples are provided below as embodiments of the invention.

Typically the invention relates to a sheet of material having a length and width with at least some of the fold creases extending across the full width and length of the sheet.

FIG. 1 illustrates a sheet 100 having a fold crease or fold line 102 extending across a full width of the sheet and a fold crease or fold line 104 extending across the full length of the sheet. In this embodiment four panels 100a, 100b, 100c and 100d result from the fold lines. Fold crease 102 is comprised of crease segments 102a, 102b and crease fold 104 is comprised of two fold segments 104a, 104b.

If the first fold is along fold line 102, then both fold segments 102a and 102b will represent a fold in a common direction, whereas the fold segments 104a and 104b will represents folds in opposite directions. Of course, if the first fold is along fold crease 104, the reverse will be true.

Although FIG. 1 illustrates individual panels 100a, 100b, 100c and 100d which have a height or length greater than a width, the present invention can be utilized through a wide range of proportions for the individual panels including those where the width is greater than the height, the height is greater than the width or both are equal. Further, information presented on the sheet can be laid out vertically, horizontally or at any angle in between and can include textual material, graphic material, pictorial material, etc. As discussed below, certain aspects of the invention do provide for presenting certain discrete segments of information on the sheet with respect to locations of particular panels and fold lines, but that aspect of the invention will be discussed in greater detail below.

FIG. 2 illustrates a sheet 110 having six panels arranged in a three-by-two array and divided by fold lines 112 and 114 extending along a length of the sheet and fold line 116 extending across a width of the sheet.

FIG. 3 illustrates an embodiment of the invention wherein a sheet 120 is provided which has a series opf panels arranged in two rows, the exact number of panels in each row is designated as being variable. That is, while FIGS. 1 and 2 show two and three panels in each row, respectively, FIG. 3 indicates that the present invention can be used in an arrangement where the number of panels in each row is limited only by the foldability of the sheet.

FIG. 4 illustrates a sheet of material 130 in which fold lines are arranged to provide a two-by-three array, that is, three rows of two panels each, as defined by a fold line 132 extending the full length of the sheet and two fold lines 134, 136 extending the full width of the sheet.

FIG. 5 illustrates a sheet of material 140 having fold creases arranged to provide nine panels in a three-by-three array.

FIG. 6 illustrates a sheet of material 150 in a manner similar to that shown in FIG. 3, however the sheet here is shown to have three rows of panels with an undefined number of panels in each row, representing that, again, any number of panels may be provided in each row limited only by the foldability of the sheet.

FIG. 7 illustrates the sheet in which there are four rows of two panels in each row while FIG. 8 illustrates a sheet having four rows with three panels in each row.

FIG. 9 illustrates a sheet 180 in which there are four rows of an undetermined number of panels in each row, in the manner shown in FIGS. 3 and 6.

Finally, FIG. 10 illustrates a sheet of material 190 having an undefined number of rows and an undefined number of panels in each row, thus representing that the number of lengthwise fold lines and widthwise fold lines is limited in total only by the overall foldability of the sheet.

Thus, the present invention can be utilized through a wide range of sheet and fold configurations.

In a preferred embodiment of the invention the result of folding the sheet will be to arrive at a folded sheet having the dimensions of a single panel. Although it is preferred that this single panel be of a size which can easily fit in a pocket, a purse or a wallet or some similar sized carrying case, many aspects of the invention can be utilized wherein the result and folded sheet is larger than the preferred size.

In the preferred size, again the precise folded dimensions may vary, but generally the resulting folded sheet should be the size of a single panel which is not greater than twenty square inches. Thus, the final panel might be 4 inches by 5 inches, 4 inches by 4 inches or 3 inches by 5 inches or smaller dimensions along each side. In a particular embodiment of the invention the folded sheet represents a credit card size which is approximately 2⅛ inches by 3⅜ inches. Thus, the actual sheet itself, when fully opened, would be dimensioned in a multiple of those two dimensions. Another particular embodiment contemplates a business card size when fully folded which would be 2 inches by 3½ inches. Again, when fully opened, the sheet would be of a multiple of those two sizes.

In order to provide a sheet of a size sufficient to convey sufficient information, yet not to require too many folds so as to be unwieldy or unfoldable, preferably the overall sheet would be dimensioned in the range of 4 inches by 7 inches up to 32 by 56 inches. Of course, various aspects of the invention could be utilized in sheets having sizes outside of this range.

It is contemplated that in carrying out some aspects of the invention the information provided on the sheet might be provided in various discrete segments, that is, a segment of information representing a certain amount of information that is complete within itself and does not require inclusion of other information which may be also provided on the sheet. As an example, in an embodiment of the invention, the folded sheet may include information on it in the form of a map or a series of maps. Each individual map would represent a discrete segment of information, such as a local area map which is complete within itself and does not require inclusion of some other map which might also be presented on the sheet of information. Other examples of discrete segments of information might be textual material such as a street index in which the entire street index comprises a discrete segment of information, separate from the map itself which would itself be a separate discrete segment of information. Other discrete segments of information may be provided, including individual advertisements in which each advertisement would represent a discrete segment of information.

FIG. 11 illustrates a sheet of information 200 in which there are three rows of eight panels. Each panel is marked with a letter to represent a particular segment of information and common letters represent common segments of information. Thus, the six panels 202, 204, 206, 208, 210 and 212 each contain part of a common segment of information designated as segment A. The six segments 214, 216, 218, 220, 222, 224 each contain part of a common segment of information designated as segment B. Also, the six segments 226, 228, 230, 232, 234 and 236 all contain a single segment of information, being segment C. Panels 238, 240 represent a single segment of information designated as segment D and panels 242, 244 contain a single segment of information being segment E. Segment 246 contains a segment of information E and panel 248 contains segment of information G. On the reverse side of the sheet, the entire sheet contains a single segment of information designated as segment H.

Figure 12:
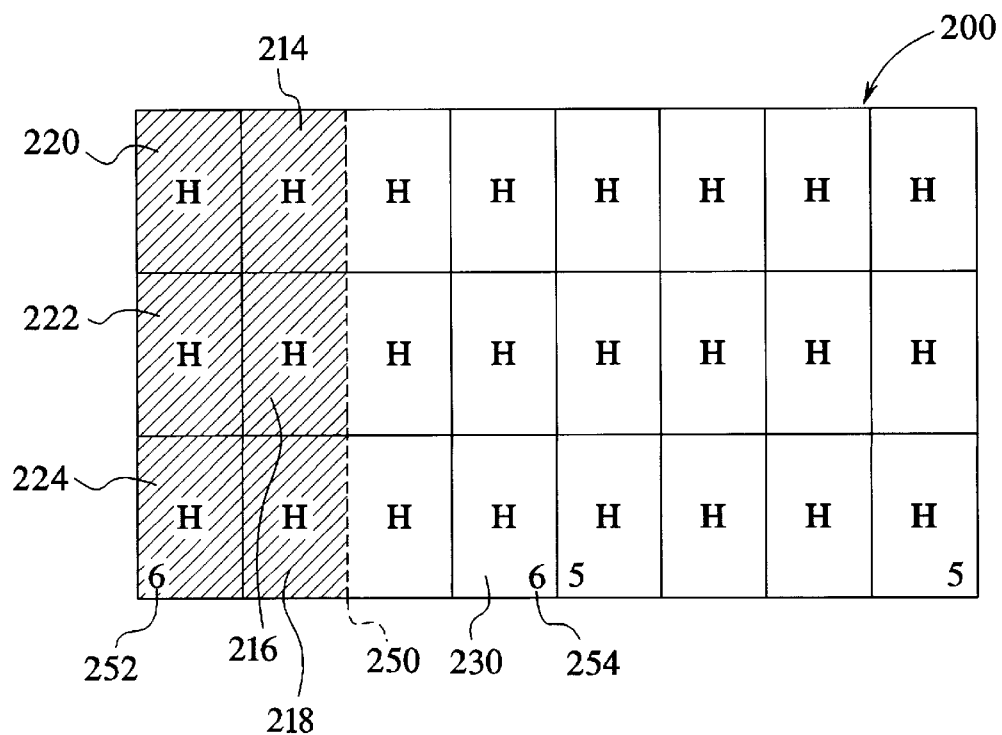
FIG. 12 is the reverse side of the sheet of FIG. 11 and illustrating a first fold line.

In FIG. 12 there is illustrated a fold line crease 250 and a shaded area representing segments 214, 216, 218, 220, 222 and 224 indicates those segments which will be folded over along fold line 250. Also, a first indicia marking 252 is provided in the corner of panel 224 and a second indicia marking 254 is provided in panel 230. These indicia markings are shown in this embodiment as being numerals, in this case the numeral 6, however, the indicia markings could be other characters or symbols including letters or graphical or pictorial symbols. Preferably the first and second indicia markings in the pair are either identical or are so closely related as to be understood to a user that the two marks form a pair or represent consecutive symbols. The two markings 252, 254 should be arranged on the panels so as to align with each other when a proper fold along the fold line occurs. Therefore, in this instance, when the fold occurs along the fold line 250, the first indicia marking 252 will overlie the second indicia marking 254. Although exact overlying is not necessary, the two markings of the pair should align in a manner to make it clear to the user that a fold should be made along a fold line so as to align the two indicia markings of the pair.

Figure 13:
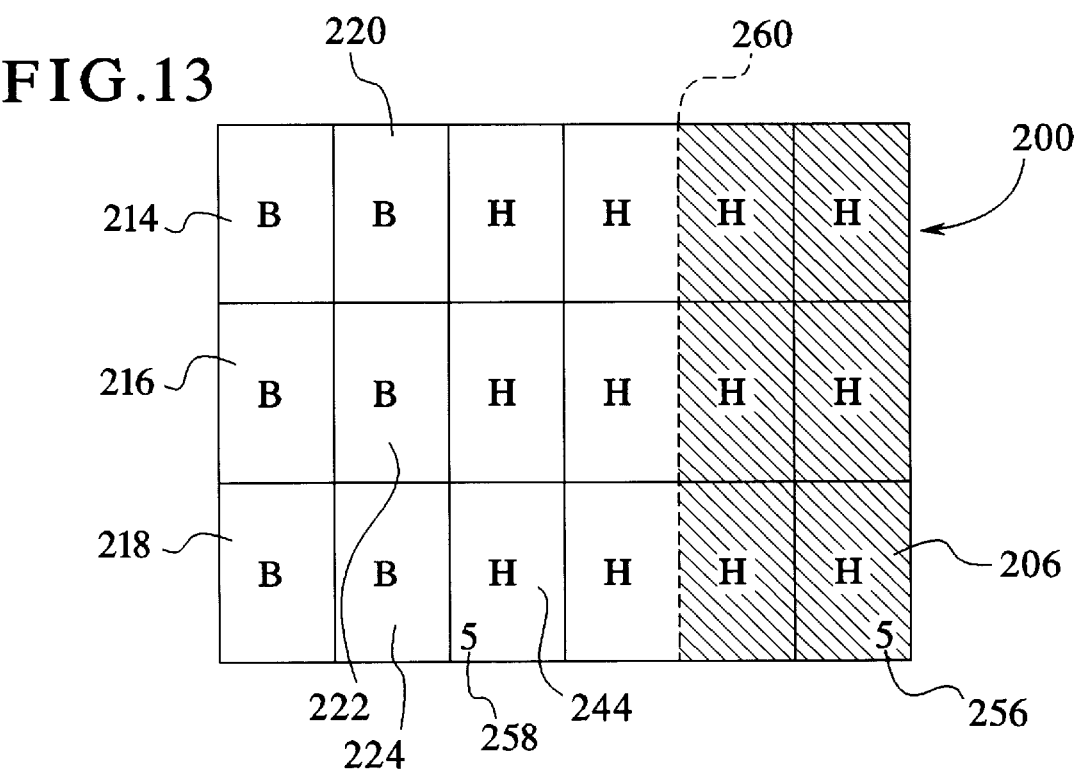
FIG. 13 shows the sheet of FIG. 12 after folding along the first fold line and illustrating a second fold line.

FIG. 13 illustrates the sheet 200 after it has been folded along fold line 250. It is seen that now that segment of information B, on panels 214, 216, 218, 220, 222 and 224, is visible, while a portion of segment of information H still remains visible. A second pair of indicia markings 256, 258 are shown in FIG. 13. The first indicia marking 256 is located in panel 206 while the second indicia marking 258 is located in panel 244. Again, these indicia markings 256, 258 are similar to each other, in this case the identical numeral 5, and are different from the previously used indicia marking and are aligned with each other so that they will overlie when fold is made along fold 260.

Figure 14:
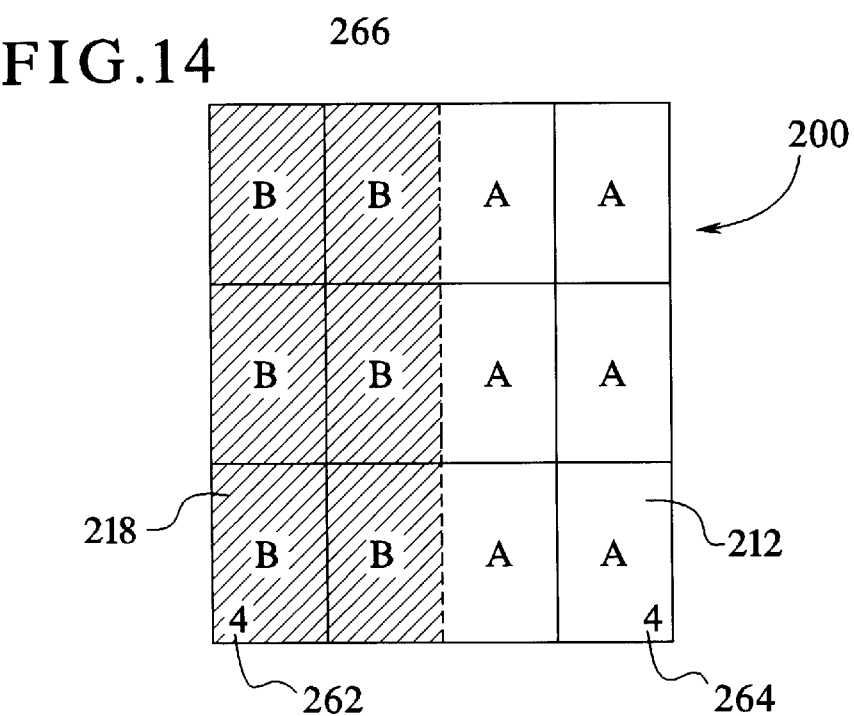
FIG. 14 illustrates the sheet of FIG. 13 after folding along the second fold line and illustrating a third fold line.

FIG. 14 illustrates the sheet 200 after fold has been made along fold line 260. It is seen that in addition to segment of information B, segment of information A is now fully visible. Also, a first of a pair of indicia markings 262 is provided in panel 218 and a second indicia marking of the pair 264 is provided in panel 212. Again, these indicia markings are identical numerals and are aligned so as to overlie one another after a fold along a fold line 266 is accomplished.

Figure 15:
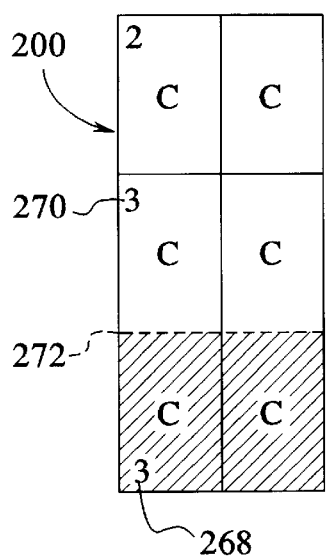
FIG. 15 illustrates the sheet of FIG. 14 after folding along the third fold line and illustrating the fourth fold line.

FIG. 15 illustrates the sheet of material 200 after a fold has been made along fold line 266. It is seen now that the entire discrete segment of information C is fully visible. Also, a first indicia marking 268 of a pair and a second indicia marking 270 of the pair are provided, again identical numerals aligned so as to overlie one another when a fold has been made along a fold line 272.

Figure 16:
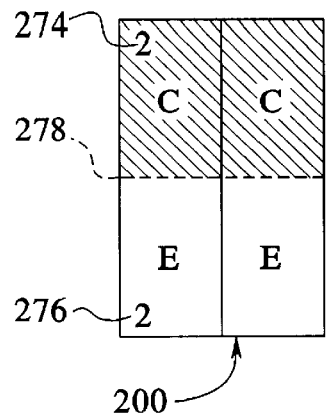
FIG. 16 illustrates the sheet of FIG. 15 after folding along the fourth fold line and illustrating the fifth fold line.

FIG. 16 illustrates the sheet of material 200 after a fold has been made along fold line 272 and it illustrates that the full segment of information E is fully visible. A first 274 of a pair of indicia markings and a second 276 indicia marking of the pair are indicated which again are identical numerals aligned so as to overlie when a fold is made along a fold line 278.

Figure 17:
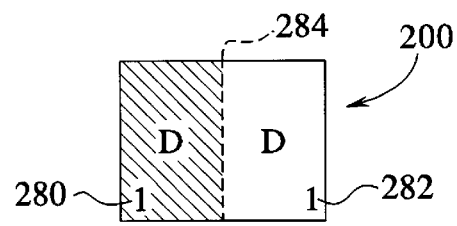
FIG. 17 illustrates the sheet of FIG. 16 after folding along the fifth fold line and illustrating the sixth fold line.

FIG. 17 illustrates the sheet of material 200 after the sheet has been folded along fold line 278. Now segment of information D is fully visible. A first 280 indicia marking and a second 282 indicia marking of a pair are provided. Again identical numerals arranged so as to align by overlying one another after a fold along line 284 has occurred.

Figure 18:
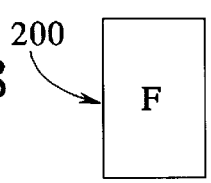
FIG. 18 illustrates the face remaining after folding the sheet of FIG. 17 along the sixth fold line.

FIG. 18 illustrates sheet of material 200 after a fold along line 284 has occurred. It is seen that the full segment of information F is fully visible on this final one panel sized face of the folded sheet.

Figure 19:
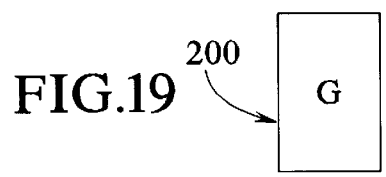
FIG. 19 illustrates the opposite face of FIG. 18 after folding along the sixth fold line.
Figure 26:
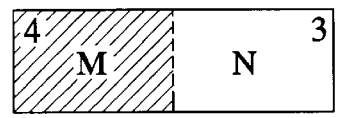
FIG. 26 illustrates the sheet of FIG. 25 after the fifth fold and illustrates a sixth fold line.

FIG. 19 illustrates the opposite face of folded material and it is seen that the full segment of information G is fully visible on this side.

Thus, while segments of information F and G are fully visible without opening any folds, the entire segment of information D can be viewed by opening the first opening fold. The full segment of information E can be viewed upon opening the first and second opening folds, while the full segment of information C can be viewed upon the opening of the first three folds. Similarly, information segment A and information segment B are fully visible upon opening the fourth fold and, finally, information segment H is fully visible upon the opening of the sixth fold.

The provision of the indicia markings will provide the user with a ready source of instruction as to how re-fold the sheet of material in the correct fashion so as to arrive at the correct compacted folded state shown in FIGS. 18 and 19, without any misfolding occurring. This will permit repeated unfolding to view various complete segments of information without causing the user to fully open and re-fold the sheet of material in an incorrect manner which might be detrimental to the integrity of the sheet.

Although in this particular example the indicia markings are numerals and are arranged in consecutive order designating the opening fold numbers, the invention is not limited to the use of numerals or even consecutive symbol schemes, however, it can be seen that such an arrangement provides a distinct advantage and assistance to the user.

FIGS. 20–28 illustrate another sheet of material 300 which is presented in a reverse arrangement from the sheet shown in FIGS. 11–19, even though both arrangements extend three units in one direction and eight units in the other direction. The sheet of FIG. 11 is presented horizontally while the sheet in FIG. 20 is presented vertically. A similar convention is used for illustrating the various folds and segments of information in FIGS. 20–28 as was shown and described with respect to FIGS. 11–19. That is, in FIG. 20, the sheet 300 is shown with a first sheet showing various segments of information on individual panels and FIG. 21 shows the sheet 300 on the reverse face wherein a single segment of information I is presented. Again folds occur along fold lines with indicia symbols (here consecutive single numerals rather than pairs) aligning as each fold occurs. In fact, the folds illustrated in FIGS. 21, 22 and 23 are essentially identical to those shown in FIGS. 12, 13 and 14.

Figure 24:
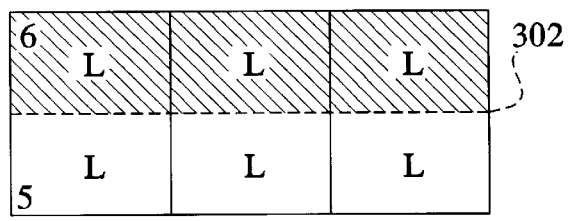
FIG. 24 illustrates the sheet of FIG. 23 after the third fold and illustrates a fourth fold line.
Figure 27:
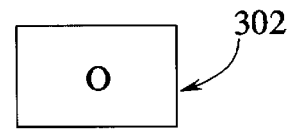
FIG. 27 illustrates the sheet of FIG. 26 after the sixth fold.
Figure 25:
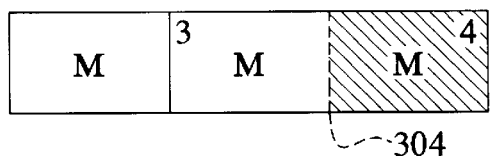
FIG. 25 illustrates the sheet of FIG. 24 after the fourth fold and illustrates a fifth fold line.
Figure 28:
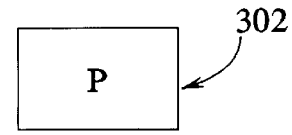
FIG. 28 illustrates the reverse face from FIG. 27.

However, the fold pattern in FIG. 24 differs from that shown in FIG. 15 in that a fold line 302 is illustrated which extends along a length, rather than across a width of the sheet as it is then folded. Thus, the resulting folded sheet appearing in FIG. 25 displays three new panels with information segment M, rather than the two new panels with information segment E shown in FIG. 16. The next fold along fold line 304, however, only presents one new panel showing information segment N as opposed to the two new panels with information segment D as shown in FIG. 17. Finally, the resulting fully folded sheet as shown in FIGS. 27 and 28 is identical to that shown in FIGS. 18 and 19 wherein there is a single panel having a segment of information O on one face and the segment of information P on an opposite face.

Figure 29:
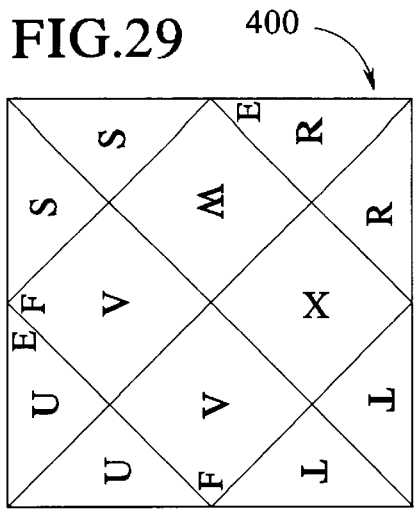
FIG. 29 illustrates a sheet having diagonal fold lines.

FIGS. 29–37 illustrate a sheet of material 400 which is folded in a different pattern than discussed previously, and in fact, includes diagonal folds which do not extend across a full width or full length of the sheet. FIG. 29 illustrates one side of the sheet having a plurality of panels with various segments of information R through X displayed on one or more panels.

Figure 30:
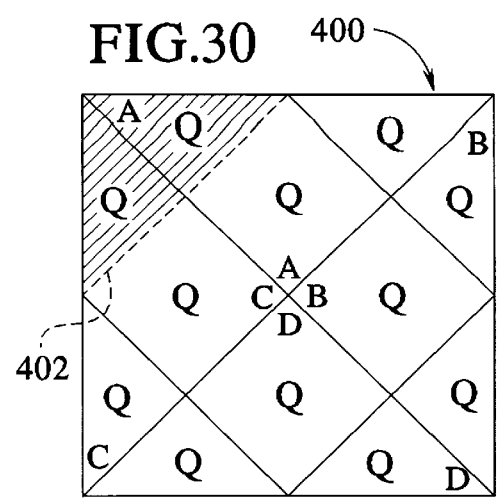
FIG. 30 is a reverse side of the sheet of FIG. 29 and illustrates a first fold line.

FIG. 30 illustrates the opposite side of the sheet in which information segment Q occupies all of the panels of this side of the sheet. A fold line 402 is indicated which is a diagonal line and a pair of indicia markings 403, being the letters "A", are shown.

Figure 31:
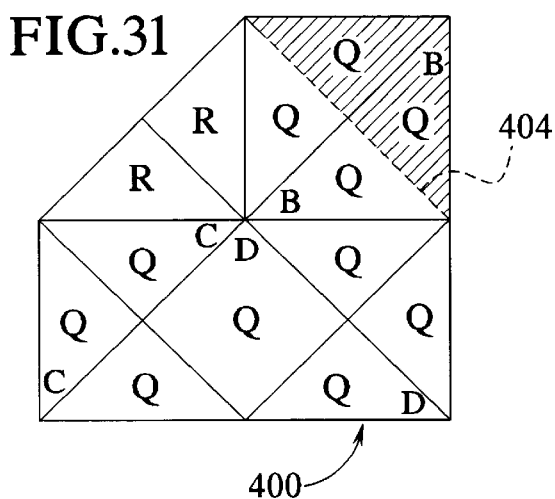
FIG. 31 illustrates the sheet of FIG. 30 after the first fold and illustrates a second fold line.

FIG. 31 illustrates the sheet 400 after the first fold has been made along fold line 402 thus rendering information segment R visible. A next fold line 404 is indicated as are indicia markings 405.

Figure 32:
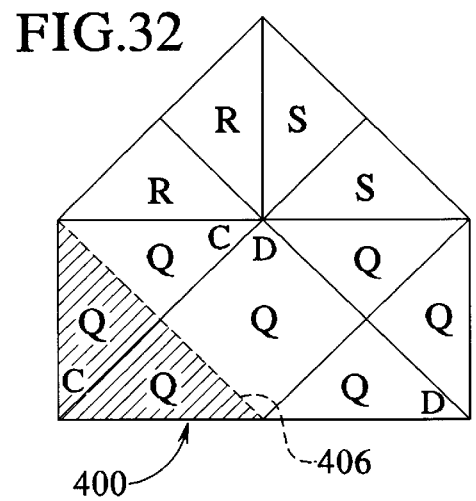
FIG. 32 illustrates the sheet of FIG. 31 after the second fold and illustrates a third fold line.

FIG. 32 illustrates the sheet 400 after the fold has been made along fold line 404 thus bringing information segment S into view. A subsequent fold line 406 is indicated along with indicia markings 407.

Figure 33:
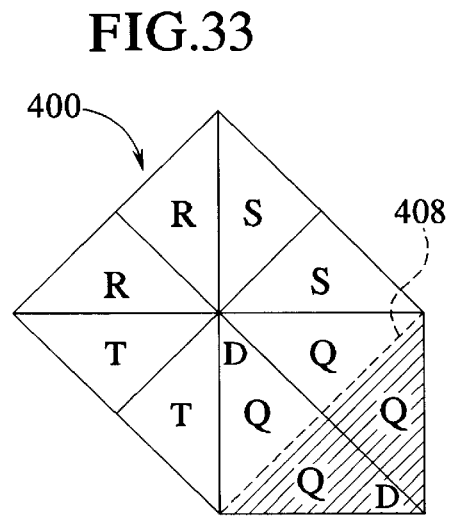
FIG. 33 illustrates the sheet of FIG. 32 after the third fold and illustrates a fourth fold line.

FIG. 33 illustrates the sheet 400 after the fold has been made along fold line 406 to bring information segment T into view. The next fold line 408 is illustrated as are indicia markings 409.

Figure 34:
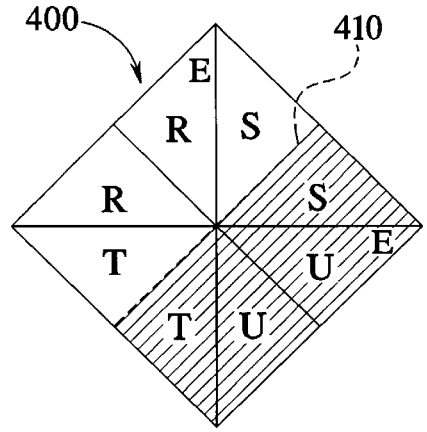
FIG. 34 illustrates the sheet of FIG. 33 after the fourth fold and illustrates a fifth fold line.

FIG. 34 illustrates the sheet 400 after fold has been made along fold line 408 bringing information segment U into view. The next fold line 410 is indicated along with indicia markings 411.

Figure 35:
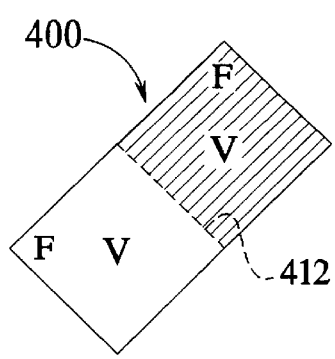
FIG. 35 illustrates the sheet of FIG. 34 after the fifth fold and illustrates a sixth fold line.

FIG. 35 illustrates the sheet 400 after the fold has been made along fold line 410 bringing the two panels containing information segment V into view. A final fold line 412 is indicated as are indicia markings 413.

Figure 36:
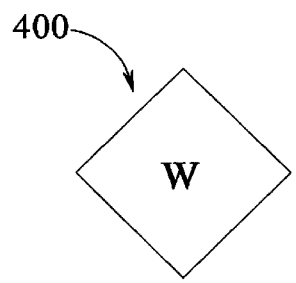
FIG. 36 illustrates the sheet of FIG. 35 after the sixth fold.
Figure 37:
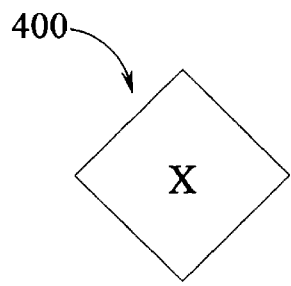
FIG. 37 illustrates the reverse face of the sheet of FIG. 36.

FIGS. 36 and 37 show the resulting two opposite faces in which information segments W and X are brought into view. As this example illustrates, the present invention is not limited to a series of rectangular folds, but may be utilized where other folds, such as diagonal folds, are to be made. Also, the example of FIGS. 29–37 illustrate the use of a sequence of matching letter pairs as indicia markings, rather than numerals to designate the proper sequence of folds.

Figure 38:
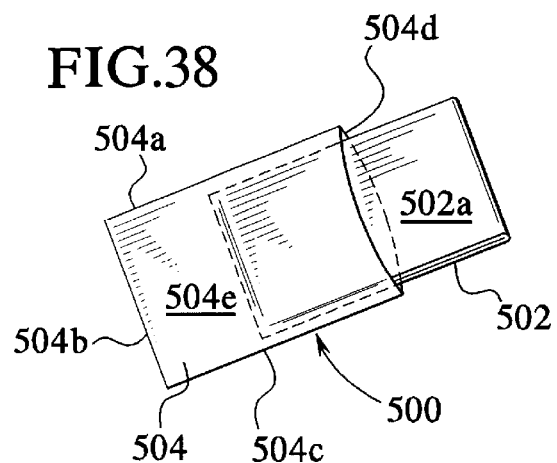
FIG. 38 is a perspective view of a folded sheet contained within a carrying case.

FIG. 38 illustrates a pocket size information sheet system generally at 500 which includes a folded sheet of information 502 which preferably is the type of folded informational sheet described above incorporating the principles of the present invention. The folded sheet is received within a package 504 which, in this example, comprises a relatively simple sleeve having three closed edges 504a, 504b and 504c and one open edge 504d. The folded sheet 502 can easily be slipped in and out of the open side 504d so that it will remain protected within the sleeve 504. In a preferred embodiment, at least one face 504e of the package 504 is transparent so that the information segment contained on the exposed panel 502a of folded sheet 502 will be visible through the wall of the package 504. In order for this overall system 500 to be pocket size, preferably the face 504e of the package 504 is not greater than 20 square inches and the package 504 has a thickness of less than one-half of an inch. In a preferred embodiment, the folded sheet 502 is folded down to approximately the size of a business card or credit card and the package 504 is sized to snugly receive the folded sheet 502.

Figure 39:
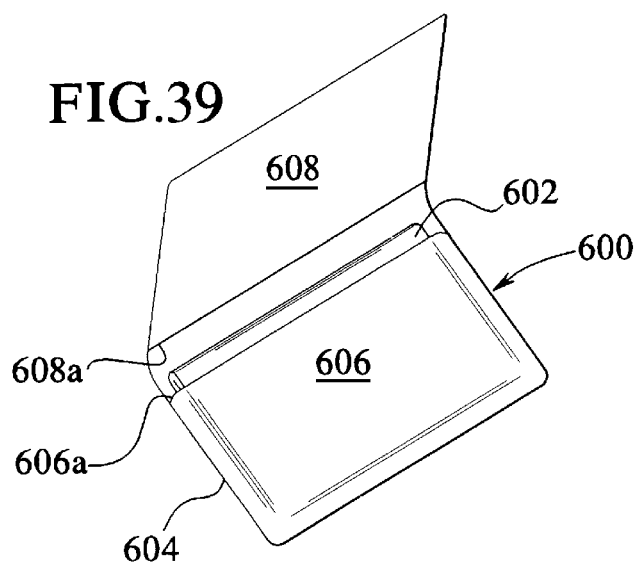
FIG. 39 is a perspective view of a folded sheet carried within a different style of carrying case.

FIG. 39 illustrates another embodiment of a pocket size information sheet system at 600 in which a folded sheet of material 602 is received within a folding style package 604. The package 604, when fully opened, is approximately twice the size of the folded sheet 602. The package 604 has at least one interior pocket 606 having an open edge 606a for receiving the folded sheet 602. In the particular embodiment shown in FIG. 39, a second pocket 608 having an open edge 608a is also provided. Again, preferably, the exposed face of the pocket 606 is transparent to so that the information segment appearing on the exposed panel of the folded sheet 602 will be visible through the wall of the pocket. The second pocket can be used either for another folded information sheet or for carrying credit cards or business cards or other flat objects including keys such as a flat metal hotel key or a key card.

Figure 40:
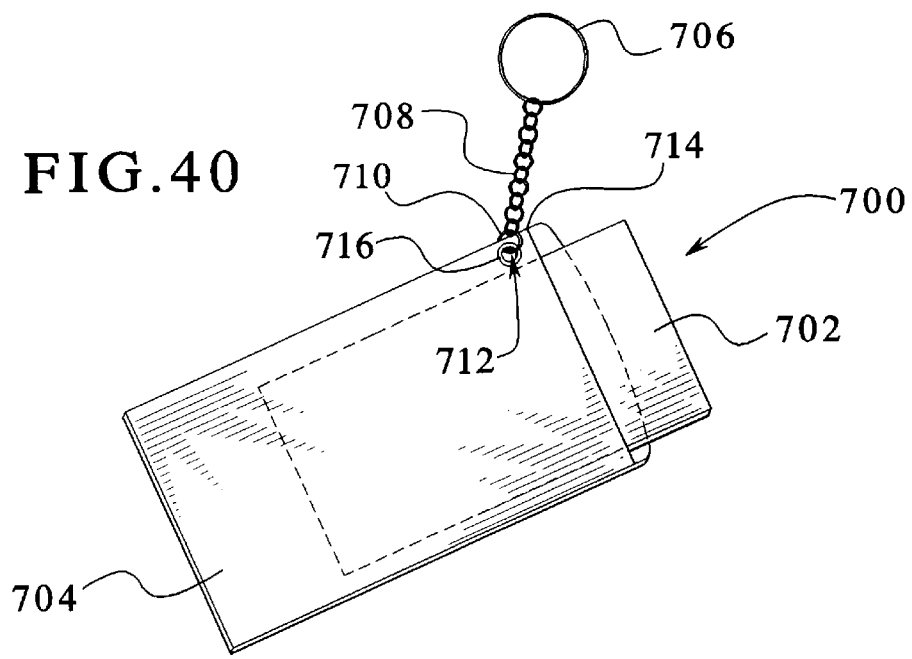
FIG. 40 is a perspective view of a folded sheet contained within a carrying case of another alternative style.

FIG. 40 illustrates another embodiment of a pocket size information sheet system at 700 where a folded sheet of material 702 is again received within a package or carrying case 704. The carrying case 704 may take on a number of different constructions including those disclosed in FIGS. 38 and 39 as well as other constructions. In this particular embodiment however, the package or carrying case further includes a key ring 706 attached to the carrying case 704 via a key chain 708.

Though the key ring and key chain may take on a number of different constructions as well, in this embodiment the key chain 708 is attached to the carrying case 704 through an end link 710 received in an opening 712 formed in the case at one of its corners 714. To protect the carrying case opening from tearing or damage, the opening 712 includes a protective eyelet 716 affixed to the carrying case within the opening. The eyelet 716 may be provided utilizing any number of materials but preferably is constructed from a material which is substantially rigid and very durable such as a metal, durable thermoplastic or plastic material.

In this embodiment, the pocket size information sheet system is readily available and at hand if attached to the keys of a user. In this instance, the information sheet may comprise a map for convenient reference to a traveler or other may include important information necessary for a particular activity and provided to a user taking part in the activity.

Figure 41:
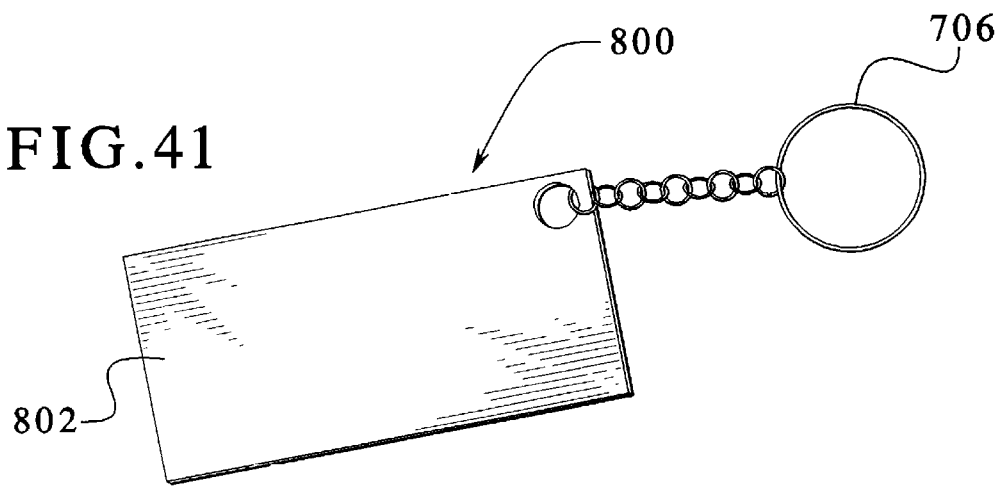
FIG. 41 is a perspective view of a map or sheet of information attached to a key ring.

FIG. 41 illustrates another embodiment of a pocket sized information sheet such as a map assembly 800. The map includes a single unfolded sheet of material such as a map 802 which itself is pocket sized. The map assembly 800 includes a key ring 706 attached thereto which is essentially the same as that described for the embodiment of FIG. 40. The present embodiment of FIG. 41 provides for a small pocket sized map 800 which may be laminated or otherwise provided from a sturdy material which is easily accessible by being attached to the user's keys.

Figure 42:
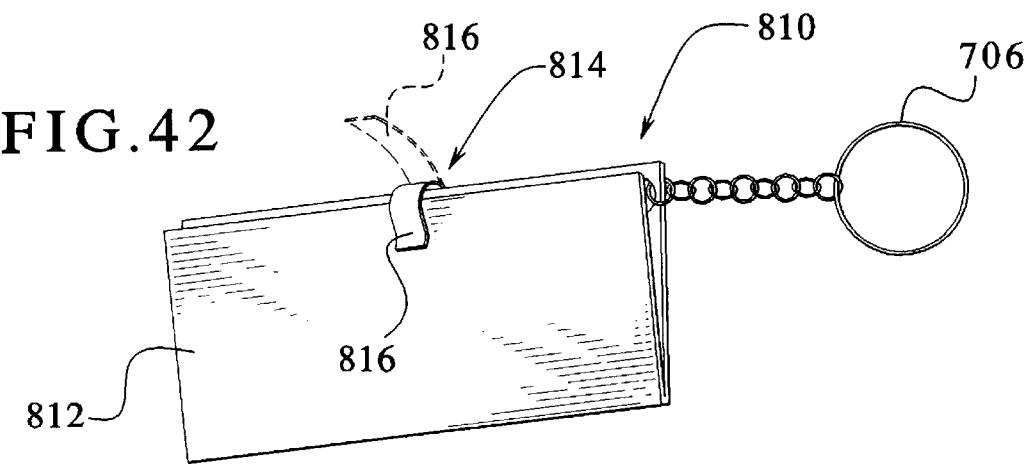
FIG. 42 is an alternative embodiment of a map or information sheet attached to a key ring.

Similarly, FIG. 42 illustrates a map assembly 810 which includes a folded information sheet or maps 812 which may include one or more folds as described above for the prior embodiments. Again, this map assembly 810 includes a key ring 706 attached as described for the embodiment of FIG. 40. In the present embodiment, the map assembly 810 also includes a closure device 814 for securely holding the folded map 812 in a closed condition. The closure device 814 is illustrated in an unlatched position in phantom view. The closure device 814 may take on any number of configurations and constructions such as a strap 816 attached to one outer flap of the map 812. The strap 816 laps over to another outer flap of the map for securing thereto. Any number of securing means such as hook and loop fastener material or a snap or an encircling elastic loop may be utilized to secure the closure device 814 as will be evident to those skilled in the art.

By the present inventive folding system, the user is provided with an information sheet containing a number of segments of information, some of which can be fully accessed by partially unfolding the sheet. The sheet can then be re-folded easily and quickly by reference to the indicia markings and can be returned to the package for safe and compact storage.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A system for folding a sheet of material comprising:
   a sheet having a length and a width;
   a plurality of creases formed in said sheet representing fold lines for said sheet;

at least one of said creases extending across a full width of said sheet and at least one of said creases extending across a full length of said sheet; and a plurality of first fold guide indicia markings on said sheet, each positioned so as to individually align with a corresponding one of a plurality of second fold guide indicia markings, with a fold interposed between each of said corresponding of said first and second fold guide indicia markings, as said sheet is correctly and sequentially folded along said plurality of crease lines.

2. A system according to claim 1, wherein at least one of said creases comprises a plurality of crease segments with adjacent crease segments representing folds of opposite directions.

3. A system according to claim 1, wherein said first and said corresponding one of said second indicia markings are pairs of identical numbers, each corresponding to the fold number in a correct sequence of one of folding and unfolding said sheet.

4. A system according to claim 1, wherein said each of said first indicia markings is identical to said corresponding one of said second indicia markings.

5. A system according to claim 1, wherein said sheet has a continuous outer periphery uninterrupted by slits.

6. A system according to claim 1, wherein all of said creases extend either across the full width or the full length of said sheet.

7. A system according to claim 1, wherein said sheet is a multiple of 2 inches by 3.5 inches.

8. A system according to claim 1, wherein said sheet is dimensioned in the range of 4 inches by 7 inches to 32 inches by 56 inches.

9. A system for folding a sheet of material comprising:

a sheet having a length, a width and a rectangular periphery;

a plurality of creases formed in said sheet representing fold lines for said sheet and defining a plurality of discrete panels of said sheet;

at least one of said creases extending across the full width of said sheet and at least one of said creases extending across a full length of said sheet;

a plurality of first fold guide indicia markings on said sheet, each positioned so as to individually overlie a corresponding one of a plurality of second fold guide indicia markings with a fold interposed between said markings as said sheet is correctly and sequentially folded along said plurality of crease lines; and wherein each sequential fold exposes an independent complete set of information on one or more of said discrete panels.

10. A single sheet of material having information printed thereon foldable along fold lines, said sheet comprising:

a length and a width;

two fold lines extending along the entire length of said sheet and seven fold lines extending along the entire width thereby forming twenty four panels bounded by said fold lines in a three by eight array;

corresponding pairs of fold guide indicia markings placed on said sheet such that individual markings of each pair overlie one another on opposite sides of a fold line when said sheet is properly folded along said fold lines; and said information having a plurality of complete sets of information, each set disposed on one or more of said panels and arranged such that the entirety of one or more of said complete sets of information is visible upon the opening of a selected number of folds.

11. A single sheet according to claim 10, wherein one of said complete sets of information consumes one entire side of said sheet and a plurality of complete sets of information are printed on an opposite side of said sheet.

12. A sheet of material comprising:

at least first and second folds perpendicular to one another one of said folds extending across the full width of said sheet and the other of said folds extending across a full length of said sheet;

a plurality of first fold guide indicia markings on said sheet, each positioned so as to individually align with a corresponding one of a plurality of second fold guide indicia markings, with one of said folds interposed between each of said corresponding of said first and second markings, as said sheet is correctly and sequentially folded along said folds; and wherein one side of said sheet has a length defined by multiples of 1–4 inches, and an adjacent perpendicular side having a length defined by multiples of 2–5 inches, and said sheet being folded at least once in each of two perpendicular directions to result in a folded sheet having dimensions of 1–4 inches by 2–5 inches.

13. A system according to claim 1, wherein said sheet, when fully folded along said plurality of crease lines, has a size no greater than 20 square inches.

14. A system according to claim 1, wherein said sheet includes information printed thereon, at least some of said information comprising a map.

15. A system according to claim 9, wherein said sheet, when fully folded along said plurality of crease lines has a size no greater than 20 square inches.

16. A system according to claim 9, wherein said sheet includes information printed thereon, at least some of said information comprising a map.

17. A single sheet of material according to claim 10, wherein said sheet, when folded along said fold lines comprises a size no greater than twenty square inches.

18. A single sheet of material according to claim 10, wherein at least one of said complete sets of information comprises a map.

19. A sheet of material according to claim 12 including information printed on said sheet, at least some of said information comprising a map.

20. A sheet of material according to claim 12 and further including a package for removably receiving said folded sheet.

21. A sheet of material according to claim 20, wherein said package has at least one transparent face.

22. A sheet of material according to claim 20 including a key chain connected to said package.

* * * * *